US011891725B2

(12) United States Patent
Lindgren et al.

(10) Patent No.: US 11,891,725 B2
(45) Date of Patent: *Feb. 6, 2024

(54) RECYCLING OF CELLULOSIC TEXTILES

(71) Applicant: RE:NEWCELL AB, Stockholm (SE)

(72) Inventors: Christofer Lindgren, Stockholm (SE); Gunnar Henriksson, Solna (SE); Mikael Lindström, Lidingö (SE)

(73) Assignee: RE:NEWCELL AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,495

(22) Filed: Feb. 27, 2023

(65) Prior Publication Data

US 2023/0250559 A1 Aug. 10, 2023

Related U.S. Application Data

(63) Continuation of application No. 16/341,086, filed as application No. PCT/EP2017/076360 on Oct. 16, 2017, now Pat. No. 11,618,978.

(30) Foreign Application Priority Data

Oct. 19, 2016 (SE) .................................. 1651375-6

(51) Int. Cl.
| | |
|---|---|
| *D01F 2/00* | (2006.01) |
| *C08B 16/00* | (2006.01) |
| *C08J 11/08* | (2006.01) |
| *C08J 11/16* | (2006.01) |

(52) U.S. Cl.
CPC ................ *D01F 2/00* (2013.01); *C08B 16/00* (2013.01); *C08J 11/08* (2013.01); *C08J 11/16* (2013.01); *C08J 2301/02* (2013.01)

(58) Field of Classification Search
None
See application file for complete search history.

(56) References Cited

U.S. PATENT DOCUMENTS

| | | | |
|---|---|---|---|
| 2,841,579 | A | 7/1958 | Villefroy et al. |
| 3,318,657 | A | 5/1967 | Wade |
| 3,591,325 | A | 7/1971 | Sapers |
| 4,227,881 | A | 10/1980 | Fono |
| 4,912,791 | A | 4/1990 | Streit et al. |
| 5,464,501 | A | 11/1995 | Kogan et al. |
| 5,549,715 | A | 8/1996 | Olip |
| 5,609,676 | A | 3/1997 | von der Eltz |
| 11,414,789 | B2 | 8/2022 | Lindstrom et al. |
| 2004/0000012 | A1 | 1/2004 | Scarpello et al. |
| 2016/0369453 | A1 | 12/2016 | Sze |
| 2016/0369456 | A1* | 12/2016 | Flynn ....................... D21C 3/20 |

FOREIGN PATENT DOCUMENTS

| | | |
|---|---|---|
| CN | 1053820 A | 8/1991 |
| CN | 102747622 B | 4/2014 |
| EP | 654557 A1 | 5/1995 |
| EP | 0717131 A1 | 6/1996 |
| GB | 615741 A | 7/1950 |
| GB | 664340 A | 1/1952 |
| IN | 146666 | 8/1979 |
| WO | 20101124944 A1 | 4/2010 |
| WO | 2012057684 A1 | 5/2012 |
| WO | 2013004909 A1 | 1/2013 |
| WO | 2013124265 A1 | 8/2013 |
| WO | 2014045062 A1 | 3/2014 |
| WO | 2014162062 A1 | 10/2014 |
| WO | 2015077807 A1 | 6/2015 |

OTHER PUBLICATIONS

International Search Report for corresponding International Application No. PCT/EP2017/076360 dated Jan. 16, 2018.
Written Opinion of the International Searching Authority for corresponding International Application No. PCT/EP2017/076360 dated Jan. 16, 2018.
Ohno H and Fukaya Y (2009) Task specific ionic liquids for cellulose technology Chemistry Letters V38.
Mantanis, "Swelling of Lignocellulosic Materials in Water and Organic Liquids," PhD Thesis, 1994.
Wang, "Pretreatment and Enzymatic Treatment of Spruce, A functional designed wood components separation for a future biorefinery," PhD Thesis, 2014, Stockholm, Sweden.
Rydholm, Pulping Processes, Chapter 15 "Carbohydrate-Removing Methods,"1965, Interscience Publishers, a division of John Wiley & Sons, pp. 992-996.
Guanghua et al, Chapter 3, "Surface Active Energizing and Cooking Aided Energizing," China Light Industry Blood Press. 2001.4.
H. Dozol et al., "On the Synthesis of Au Nanoparticles Using EDTA as a Reducing Agent", J. Phys. Chem. C 2013, 117, 40, 20958-20966—Abstract: https://doi.org/10.1021/jp4067789 Sep. 16, 2013.
Dictionary of Fiber & Textile Technology, p. 195, 1999.
Yan Wang, Appendix VI to "Pretreatment and enzymatic treatment of spruce", PhD thesis publication date: Sep. 24, 2014.
Declaration under 37 C.F.R.§1.132 of Dr. Tahani Kaldeus dated Jun. 2, 2019 in U.S. Pat. No. 11,414,789 B2.
Rout et al., "Evidence of the Generation of Isosaccharinic Acids and Their Subsequent Degradation by Local Microbial Consortia within Hyper-Alkaline Contaminated Soils, with Relevance to Intermediate Level Radioactive Waste Disposal", PLoS One 10(3): e0119164; Published Mar. 6, 2015.
Alen et al., "Gas-liquid chromatographic separation of hydroxy monocarboxylic acids and dicarboxylic acids on a fused-silica capillary column", J Chromatogr 301:273-276, 1984.

(Continued)

*Primary Examiner* — Stefanie J Cohen
(74) *Attorney, Agent, or Firm* — Renner, Otto, Boisselle & Sklar, LLP

(57) ABSTRACT

A method for recycling textiles comprising cellulose with the following steps of: optionally disintegrating the textile, swelling the cellulose, under reducing conditions, wherein at least one reducing agent is present at least during a part of the swelling, and then performing at least one of the following two bleaching steps in any order: i) bleaching the material with oxygen at alkaline conditions with a pH in the range 9-13.5, and ii) bleaching the material with ozone at acid conditions below pH 6. An advantage is that the yield is improved at the same time as excellent decolourization is achieved. If the recycled material is used in viscose manufacture, the risk of clogging nozzles and so on is reduced.

18 Claims, No Drawings

(56) References Cited

OTHER PUBLICATIONS

Linden et al., "Stabilising mannose using sodium dithionite at alkaline conditions", Holzforschung, 74 (2: 131-140); May 24, 2019.
Glaus et al., "Cellulose Degradation at Alkaline Conditions: Long-Term Experiments at Elevated Temperatures", PSI Bericht Nr. 04-01, ISSN 1019-0643; Apr. 2004.
Maattanen et al., "RedOx: Reduction followed by oxidation: Test report from VTT", Dec. 13, 2022.
Holleman-Wiberg, "Lehrbuch der Anorganischen Chemie (Textbook of Inorganic Chemistry)": Walter de Gruyter, Edition 101, Auflage, 1995, pp. 577 and 1010.

\* cited by examiner

RECYCLING OF CELLULOSIC TEXTILES

This application is a continuation of U.S. application Ser. No. 16/341,086 filed Apr. 11, 2019, which is a national phase of International Application No. PCT/EP2017/076360 filed Oct. 16, 2017, which claims priority to Swedish Application No. 1651375-6 filed Oct. 19, 2016, all of which are hereby incorporated by reference.

TECHNICAL FIELD

The present invention relates to a process for recycling of cellulose from textile comprising cellulose.

BACKGROUND

Cellulose is an important constituent in plants and comprises anhydrous glucose units. Cellulose is utilized for making synthetic fibers for instance by spinning a yarn or a thread. Recycled cellulose can be regenerated and used for spinning yarn, thread, fibers etc.

There are several known ways to dissolve cellulose for various applications including manufacture of regenerated cellulosic fiber. Often expensive chemicals are used in such processes. (Ohno H and Fukaya Y (2009) Task specific ionic liquids for cellulose technology Chemistry Letters V38)

WO2013124265 discloses a process for the regeneration of cellulose. It discloses treatment of cellulose in an alkaline step and with oxygen. Reduction of the viscosity with oxygen is mentioned. Recycling of cloth is mentioned and a pre-treatment may be desirable to lower the degree of polymerization. It is also mentioned that the cellulose can be used to make a new fiber such as viscose.

WO 20101124944 discloses a process for the hydrolysis of cellulose comprising the sequential steps: a) mixing cellulose with a viscosity below 900 ml/g with an aqueous solution to obtain a liquid, wherein particles comprising cellulose in said liquid have a diameter of maximum 200 nm, wherein the temperature of the aqueous solution is below 35° C., and wherein the pH of the aqueous solution is above 12, b) subjecting the liquid to at least one of the steps: i) decreasing the pH of the liquid with at least 1 pH unit, ii) increasing the temperature by at least 20° C., and c) hydrolyzing the cellulose.

WO2012057684 discloses a process for derivatization of cellulose. The cellulose which should not have too high viscosity is subjected to high pH and low temperature where after the pH is increased and/or the temperature is increased. Then the cellulose is derivatized.

WO2013004909 discloses a method of removing hemicelluloses from pulp.

WO2014162062 discloses a method for manufacturing a shaped article of cellulose. It comprises use of a dissolved cellulose material. The cellulose is dissolved with a certain class of solvents (DBN-based ionic liquids).

CN102747622 discloses a process for removing the indigo color from jeans. The fabric is put water in a weight ratio of 1:20-30 and heating at 85-95° C., adding 2-3 g/l of sodium hydroxide, 4-5 g/l of peeling agent, 3-5 g/l of peregal and 4-5 g/l of sodium hydrosulfite and performing ultrasonic vibration and, draining the mixed solution, and washing the fabric using water 2-3 times.

WO2014/045062 discloses a process for extracting polyester with the aid of solvents.

U.S. Pat. No. 5,609,676 discloses a process comprising a ripening step to increase the reactivity before treatment with carbon disulfide to manufacture reusable viscose. The ripening step is immediately before the viscose manufacturing and has the purpose to adjust the polymerization degree of the cellulose. The ripening can be made with an alkali solution but also with cellulose degrading enzymes (cellulases). According to U.S. Pat. No. 5,609,676 it is also possible to degrade the celluloses with dilute $H_2SO_4$. There is also disclosed treatment with a reducing Sulphur compound exclusively before the ripening step.

WO 2015/077807 discloses a process for pretreating reclaimed cotton fibers to be used in the production of molded bodies from regenerated cellulose, wherein the process comprises a metal removing stage and an oxidative bleach.

Still, there is a need for improved methods for recycling of a cellulosic material. In particular, it is desired to improve the yield in the recycling process of textiles. It would also be desirable to be able to provide a method for recycling of a cellulosic material that provides for improved de-colorization of the recycled cellulosic material.

It would also be desirable to be able to provide such a method that produces cellulosic material that can be used in a process for production of viscose without, or at least with a significant lowered tendency of causing clogging of nozzles in the viscose production process.

SUMMARY

It is an object of the present invention to obviate at least some of the disadvantages in the prior art and provide an improved process for the recycling of cellulose from textiles.

In a first aspect there is provided a method for recycling textiles comprising cellulose, said method comprising the sequential steps: a) providing at least one textile material comprising cellulose, b) treating the material to swell the cellulose, under reducing conditions, wherein at least one reducing agent is present at least during a part of the swelling, c) performing at least one of the following two bleaching steps in any order i) bleaching the material with oxygen at alkaline conditions pH 9-13.5, and ii) bleaching the material with ozone at acid conditions below pH 6.

In particular, a swelling step of cellulose is improved so that the yield is improved. One advantage is an improvement in the swelling of cellulose, so that certain side-reactions are avoided and thereby that the yield of recycled cellulose is improved.

The method for recycling of a cellulosic material, i.e. a textile, provides improved de-colorization of the recycled cellulosic material. Advantages include that non-covalent bound dyes become soluble and can be washed out, without, or with only insignificant degradation of the cellulosic material.

The method also makes it possible to control the viscosity of the material, which in turn makes it easier to avoid clogging in, for instance, a viscose production process. The method for recycling of a textile thus produces cellulosic material that can be used in a process for production of viscose without, or at least with a significant lowered tendency of causing clogging of nozzles in the viscose production process.

In addition, the present method provides for improved possibility to filter the material. The method for recycling of a textile produces cellulosic material with properties which resembles those of dissolving pulp, which is an advantage since known and existing processes can be used to treat the material.

DETAILED DESCRIPTION

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

"Solution" is used herein to denote a homogeneous mixture comprising at least one substance dissolved in a solvent.

The term "de-colorization" should be understood to mean a loss of absorbance at one or more wavelengths of light of the contaminant. Typically, de-colorization involves loss of absorbance at one or more visible wavelengths of light. Furthermore, de-colorization may be partial or complete.

The term "cellulosic material" as used herein refers to all natural cellulosic forms (cotton, linen, jute, etc.) and all regenerated cellulosic forms such as rayon. In particular all textiles comprising cellulose are encompassed including textiles comprising treated and modified cellulose.

By "dissolving pulp" (which is sometimes also called dissolving cellulose), is meant a bleached wood pulp or cotton linters that has a high cellulose content (>90%). It has special properties including as a high level of brightness and uniform molecular-weight distribution. Dissolving pulp is so named because it is not made into paper, but dissolved either in a solvent or by derivatization into a homogeneous solution, which makes it completely chemically accessible and removes any remaining fibrous structure.

In a first aspect there is provided a method for recycling textiles comprising cellulose, said method comprising the sequential steps:
a. providing at least one textile material comprising cellulose,
b. treating the material to swell the cellulose, under reducing conditions, wherein at least one reducing agent is present at least during a part of the swelling,
c. performing at least one of the following two bleaching steps in any order
 i. bleaching the material with oxygen at alkaline conditions with a pH in the range 9-13.5, and
 ii. bleaching the material with ozone at acid conditions below pH 6.

The steps a), b), and c) should be carried out in sequential order, with the proviso that the at least one bleaching step c) i) and c) ii) can be carried out in any order.

In one embodiment the at least one textile is at least one selected from the group consisting of cotton, lyocell, rayon, and viscose. In one embodiment the at least one textile is cotton. It has been shown that textiles comprising cellulose such as cotton can suitably be recycled using the present method. Mixtures of different types of textiles are also encompassed as long as at least a part of the textiles comprise cellulose.

In one embodiment the textile is mechanically disintegrated before step b) so that the textile is at least partially disintegrated in order to improve the subsequent steps. In one embodiment the textile is mechanically disintegrated in a shredder before step b). Other methods of disintegrating the textiles are also encompassed. The shredding and disintegration creates a larger surface of the material so that the subsequent steps are facilitated.

In one embodiment the pH during step b) is in the range of 9-13.5. In another embodiment the pH during step b) is in the range of 11-13.3. The swelling is thus in these embodiments carried out under alkaline pH. In one embodiment NaOH is present during step b) in a concentration from 0.01 to 0.5 mol/l. NaOH has the advantage of being a cost efficient way of raising the pH.

In one embodiment the temperature during step b) is in the range 50-100° C.

In one embodiment the at least one reducing additive comprises sodium dithionite, $Na_2S_2O_4$. In other embodiments other reducing additives are used. In one embodiment sodium dithionite, $Na_2S_2O_4$ is present during step b) in a concentration from 0.01 to 0.25 mol/l. It has been discovered that an addition of a reducing agent during the swelling of cellulose can increase the yield during the recycling of cellulose. As shown in the examples the yield can in one embodiment increase from about 97% to over 99%. When using the method in large scale such an improvement would be an advantage. The yield is calculated by weight.

During the bleaching step c) the chain length of cellulose is reduced together with other effects on the material. The bleaching is in one embodiment step c) i) only. In another embodiment the bleaching is step c) ii) only. In yet another embodiment the bleaching comprises both step c) i) and step c) ii) carried out in any order. I.e. in one embodiment the bleaching comprises step c) i) followed by step c) ii) and in an alternative embodiment the bleaching comprises step c) ii) followed by step c) i).

In one embodiment the bleaching in step c)-i) is carried out at a temperature in the interval 60-120° C.

In one embodiment, wherein the bleaching in step c)-i) is carried out during 20 minutes-24 hours. In one embodiment the upper limit is about two hours, however in an alternative embodiment extended bleaching is carried out, this is referred to as aging. In one embodiment the bleaching in step c)-i) is carried out during 30 min-120 min.

In one embodiment a wash is carried out before step c) ii). Since step c) ii) is carried out at low pH and when the preceding step is carried out at high pH it is an advantage to wash before the pH is lowered in step c) ii). In one embodiment the material is dewatered to a water content of less than 66 wt % before step c) ii). This step also serves to minimize the carry-over of liquid with high pH to the step with low pH. In one embodiment the pH during step c) ii) is in the interval pH 1.5-5.

The cellulose is recovered after step c). The recovered cellulose can be used for making new textiles or for any other purpose where cellulose is used.

In a second aspect there is provided recycled cellulose material obtained by the method as described above.

In one embodiment there is provided use of the recycled cellulosic material in a process for production of viscose.

Other features and uses of the invention and their associated advantages will be evident to a person skilled in the art upon reading this description and the appended examples.

It is to be understood that this invention is not limited to the particular embodiments shown here. The following examples are provided for illustrative purposes and are not intended to limit the scope of the invention since the scope of the present invention is limited only by the appended claims and equivalents thereof.

EXAMPLES

Example 1

An increase in glucose content (Glu) main component in cellulose can be observed when sodium dithionite ($Na_2S_2O_4$) was present during swelling of cellulose compared to the same conditions without sodium dithionite, see table 1.

This experiment was made under strong alkali conditions.

TABLE 1

| Carbohydrate composition of dithionite cooking and reference | | | | | |
|---|---|---|---|---|---|
| Pulp | Ara | Gal | Glu | Man | Xyl |
| | % based on original oven dried wood | | | | |
| Ref | 0.37 | 0.39 | 41.99 | 3.34 | 4.38 |
| +$Na_2S_2O_4$ | 0.41 | 0.40 | 43.58 | 3.41 | 4.47 |

Example 2

Cotton linters cut into small squares.

Mix together and dryness measured on IR moisture meter.

5 samples taken, each of 4 g (air-dry).

The reductive treatment during swelling was carried out at 85° C. for 30 minutes, washed, dried in heating cabinet at 60° C. and weighed.

Ozone treatment:

Each sample kept in 30 ml 1% $H_2SO_4$ for 15 min and hand squeezed.

Kept in fridge over-night.

Ozone treatment for 5 min on each sample.

An increased overall yield can be observed when sodium dithionite (reducing agent) was present during swelling of cellulose compared to the same conditions without sodium dithionite (without reducing agent), see table 2. The overall yield increased from 97.95% to 99.19% with reductive pretreatment.

CONDITIONS OF EXPERIMENT

| | Without dithionite | With ditionite |
|---|---|---|
| Reductive Treatment | | |
| Cotton linters (g), OD weight | 3.858 | 3.859 |
| NaOH (0.5M) g | 100.68 | 100.73 |
| Dithionite (g:M) | 0 | 0.861:0.050 |
| T | 85 C. | 85 C. |
| Duration (min) | 30 | 30 |
| Washed | | |
| Ozone Treatment | | |
| >Kept in 30 ml 1% H2SO4 for 30 min and hand squeezed to 30% dryness | | |
| Duration (min) | 10 | 10 |
| Extended heat treatment | | |
| >Without washing samples put in heating bath | | |
| T | 69 C. | 69 C. |
| Duration (min) | 57 | 57 |
| Washed | | |
| Yield (%) | 97.95 | 99.19 |

The invention claimed is:

1. A method for recycling textiles comprising cellulose, said method comprising the sequential steps:
   a. providing at least one textile material comprising cellulose,
   b. treating the material to swell the cellulose, under reducing conditions, wherein at least one reducing agent is present at least during a part of the swelling,
   c. performing at least one of the following two bleaching steps in any order
      i. bleaching the material with oxygen at alkaline conditions with a pH in the range 9-13.5, and
      ii. bleaching the material with ozone at acid conditions below pH 6,
   d. recovering the cellulose and using the cellulose for making new textiles or for any other purpose where cellulose is used.

2. The method according to claim 1, wherein the at least one textile is at least one selected from the group consisting of cotton, lyocell, rayon, and viscose.

3. The method according to claim 1, wherein the at least one textile is cotton.

4. The method according to claim 1, wherein the textile is mechanically disintegrated to at least partially disintegrate the cellulose before step b).

5. The method according to claim 1, wherein the textile is mechanically disintegrated in a shredder before step b).

6. The method according to claim 1, wherein the pH during step b) is in the range of 9-13.5.

7. The method according to claim 1, wherein the pH during step b) is in the range of 11-13.3.

8. The method according to claim 1, wherein NaOH is present during step b) in a concentration from 0.01 to 0.5 mol/l.

9. The method according to claim 1, wherein the temperature during step b) is in the range 50-100° C.

10. The method according to claim 1, wherein the at least one reducing additive comprises sodium dithionite, $Na_2S_2O_4$.

11. The method according to claim 1, wherein sodium dithionite, $Na_2S_2O_4$ is present during step b) in a concentration from 0.01 to 0.25 mol/I.

12. The method according to 1, wherein the bleaching in step c)-i) is carried out at a temperature in the interval 60-120° C.

13. The method according to claim 1, wherein the bleaching in step c)-i) is carried out during 20 minutes-24 hours.

14. The method according to claim 1, wherein the bleaching in step c)-i) is carried out during 30 min-120 min.

15. The method according to claim 1, wherein the at least one bleaching step comprises step c) ii), and wherein a wash is carried out before step c) ii).

16. The method according to claim 1, wherein the at least one bleaching step comprises step c) ii), and wherein the material is dewatered to a water content of less than 66 wt % before step c) ii).

17. The method according to claim 1, wherein the at least one bleaching step comprises step c) ii), and wherein the pH during step c) ii) is in the interval pH 1.5-5.

18. The method according to claim 1, wherein cellulose is recovered after step c).

* * * * *